United States Patent
Li et al.

(10) Patent No.: US 9,322,548 B2
(45) Date of Patent: Apr. 26, 2016

(54) COMBUSTOR APPLIED IN THERMOPHOTOVOLTAIC SYSTEM

(75) Inventors: Yueh-Heng Li, Tainan (TW);
Guan-Bang Chen, Tainan (TW);
Yei-Chin Chao, Tainan (TW);
Tsarng-Sheng Cheng, Tainan (TW);
Hong-Yuan Li, Tainan (TW)

(73) Assignee: National Cheng Kung University, Tainan (TW)

( * ) Notice: Subject to any disclaimer, the term of this patent is extended or adjusted under 35 U.S.C. 154(b) by 754 days.

(21) Appl. No.: 13/466,364

(22) Filed: May 8, 2012

(65) Prior Publication Data
US 2013/0157206 A1    Jun. 20, 2013

(30) Foreign Application Priority Data
Dec. 16, 2011   (TW) ............................ 100146783 A

(51) Int. Cl.
| | | |
|---|---|---|
| F23C 9/00 | (2006.01) |
| F23C 3/00 | (2006.01) |
| F23M 5/00 | (2006.01) |
| F23M 9/06 | (2006.01) |
| F23D 5/04 | (2006.01) |
| F23D 5/12 | (2006.01) |
| F23D 17/00 | (2006.01) |
| H02S 10/30 | (2014.01) |

(52) U.S. Cl.
CPC ... *F23C 3/00* (2013.01); *F23D 5/04* (2013.01); *F23D 5/123* (2013.01); *F23D 17/002* (2013.01); *F23M 5/00* (2013.01); *F23M 9/06* (2013.01); *F23C 2900/03001* (2013.01); *F23C 2900/03006* (2013.01); *F23M 2900/05004* (2013.01); *F23M 2900/13004* (2013.01); *H02S 10/30* (2014.12)

(58) Field of Classification Search
CPC ........................................................ H02S 10/30
USPC ........... 431/115, 116; 136/243, 253, 256, 257
See application file for complete search history.

(56) References Cited

U.S. PATENT DOCUMENTS

| | | | | |
|---|---|---|---|---|
| 5,942,047 A * | 8/1999 | Fraas | ...................... | H02S 10/30 136/253 |
| 6,284,969 B1 * | 9/2001 | Fraas | ...................... | H02S 10/30 136/253 |
| 6,379,789 B1 * | 4/2002 | Crowley | ............... | C04B 41/009 136/253 |
| 6,435,861 B1 * | 8/2002 | Quick | .................. | B01D 29/111 126/91 A |
| 8,581,090 B1 * | 11/2013 | Fraas | ...................... | H02S 10/30 136/246 |

* cited by examiner

*Primary Examiner* — Kenneth Rinehart
*Assistant Examiner* — Jason Lau
(74) *Attorney, Agent, or Firm* — Rosenberg, Klein & Lee

(57) ABSTRACT

A combustor applied in thermophotovoltaic system comprises a combustion device and a reversed tube covering the combustion device. The combustion device includes a combustion body made of a transparent and temperature resistant material and a burning unit disposed in the combustion body. When a burning-supported medium is adopted during burning via the burning unit, the radiant intensity is increased. The reversed tube then further redirects the hot product gas for reheating an outer wall of the combustion body in combustion. Therefore, uniform illumination is accordingly resulted for enhancing the radiant intensity. Accordingly, a photovoltaic cell plate connected to the combustor preferably transforms light into electricity. The present invention fully utilizes a micro system as well as miniature energy to offer advanced electricity.

5 Claims, 4 Drawing Sheets

COMBUSTOR APPLIED IN THERMOPHOTOVOLTAIC SYSTEM

BACKGROUND OF THE INVENTION

1. Field of the Invention

The present invention relates to a combustor, particularly to a combustor applied in thermophotovoltaic system.

2. Description of the Related Art

Various electronic products are vigorously developed today, and so are the correlated markets, such as the related power system (battery). Herein, in order to conquer problems that the traditional batteries merely provide limited ability of storing energy, various studies of enhancing energy in a micro device are contributed. For example, electronic products or power supply systems that have to be continuously operated or that consume high power could be readily portable and able to persistently work by means of the micro combustors applied in the thermophotovoltaic power system (TPV).

Generally, the thermophotovoltaic system mainly comprises three elements: the heat source, the emitter, and the PV cell array. The heat source is provided for heating the emitter, thereby allowing radiation energy generated in time of heating to be converted into electricity. Accordingly, a hot subject that discusses how to utilize the emitter and the photovoltaic cell plate to cooperatively result in great efficiency for driving the thermophotovoltaic system is raised. Moreover, in the micro combustor, a swirling system is commonly applied for increasing residence time of flow, so that the fuel/air mixture is enhanced and concurrently results in a flame stabilization mechanism via generation of a flow recirculation zone in the combustor.

However, when the combustor is physically shrunk to a critical size (less than 1 cm), the structure thereof provides little room for the fuel and the air to be mixed. As a result, the fuel and the air are mixed imperfectly, and the correlated heat recirculation is insufficient for the flame stabilization. Hence, thermal dispersion augments and the emitter adversely offers inadequate light energy for the conversion into electricity through the photovoltaic cell plate. Herein, in the conventional thermophotovoltaic system, the emitter is mostly made of silicon carbide (Sic). The advantage of the silicon carbide is that it is able to resist high temperature and it is a near-blackbody, whose radiant intensity reaches 0.9. Nonetheless, the radiant spectrum of the silicon carbide is directed to a broad spectrum, meaning that when the surface temperature of the silicon carbide reaches about 1000 K, most energy is distributed out of the spectrum scope that the photovoltaic cell plate is capable of converting, which is thus wasteful. Further, photons that are not absorbed unfavorably fall on the ultrared section, so the photovoltaic cell plate is accordingly heated up since more thermal radiation is absorbed, which readily results in failure of the photovoltaic cell plate due to the overheating temperature. Obviously, which material is adopted for making the emitter is one of the most important factors that influence the performance of the existing combustor.

SUMMARY OF THE INVENTION

It is therefore the purpose of this invention to provide a combustor that is applied in thermophotovoltaic system for enhancing abilities of the emitter and the photovoltaic cell plate so as to promote efficiency thereof.

The combustor applied in thermophotovoltaic system in accordance with the present invention comprises a combustion device and a reversed tube. Wherein, the combustion device includes a combustion body and a burning unit disposed in the combustion body. Wherein, the combustion body is transparent and heat-resistant. The combustion body includes an inner wall, an outer wall, an opening surrounded by an end of the inner wall, and an accommodating room cooperatively formed by a surrounding of the inner wall as well as communicated with the opening. The burning unit is disposed to insert into the accommodating room. A burning-supported medium is attached to the inner wall of the combustion body. A gas inlet for an entrance of combustion-supporting gas, a fuel inlet for an entrance of fuel, and a first outlet for discharge of hot product gas derived from combusting are respectively defined on the combustion body. Thereby, a fuel/air mixture is released via the burning unit. As to the reversed tube, the combustion body is covered by the reversed tube. The opening of the combustion body and the reversed tube are spaced out to form a gap. A room for air swirling is brought about while the reversed tube covers the combustion body. The room and the accommodating room of the combustion body are intercommunicated via the opening. The gap between the reversed tube and the combustion body is formed for the hot product gas to be circulated within said combustor and then discharged.

Preferably, the combustion body is made of a metal-oxide-deposited quartz material; the burning-supported medium adopts metal-oxide-deposited coating.

Preferably, the outer wall of the combustion body is plated with a filter.

Preferably, the burning unit is made of metal, and a plurality of holes are defined on the burning unit.

Preferably, a plurality of second outlets are defined on the reversed tube.

Preferably, the reversed tube is made of quartz.

Accordingly, when the combustion body is made of metal-oxide-deposited quartz, density of energy enhances and the metal-oxide-deposited quartz could be easily processed. Further, the reversed tube redirects a flow course of hot product gas generated in the combustion body in time of combustion, so that the hot product gas reheats the outer wall of the combustion body. Concurrently, a swirling flame is brought about and gets in the combustion body as well as leads to uniform illumination of the combustion body. Preferably, the CO and $NO_x$ emissions are significantly reduced.

BRIEF DESCRIPTION OF THE DRAWINGS

Exemplary embodiments of the invention are explained in the following with reference to drawings.

DETAILED DESCRIPTION OF THE PREFERRED EMBODIMENTS

Figure 1:
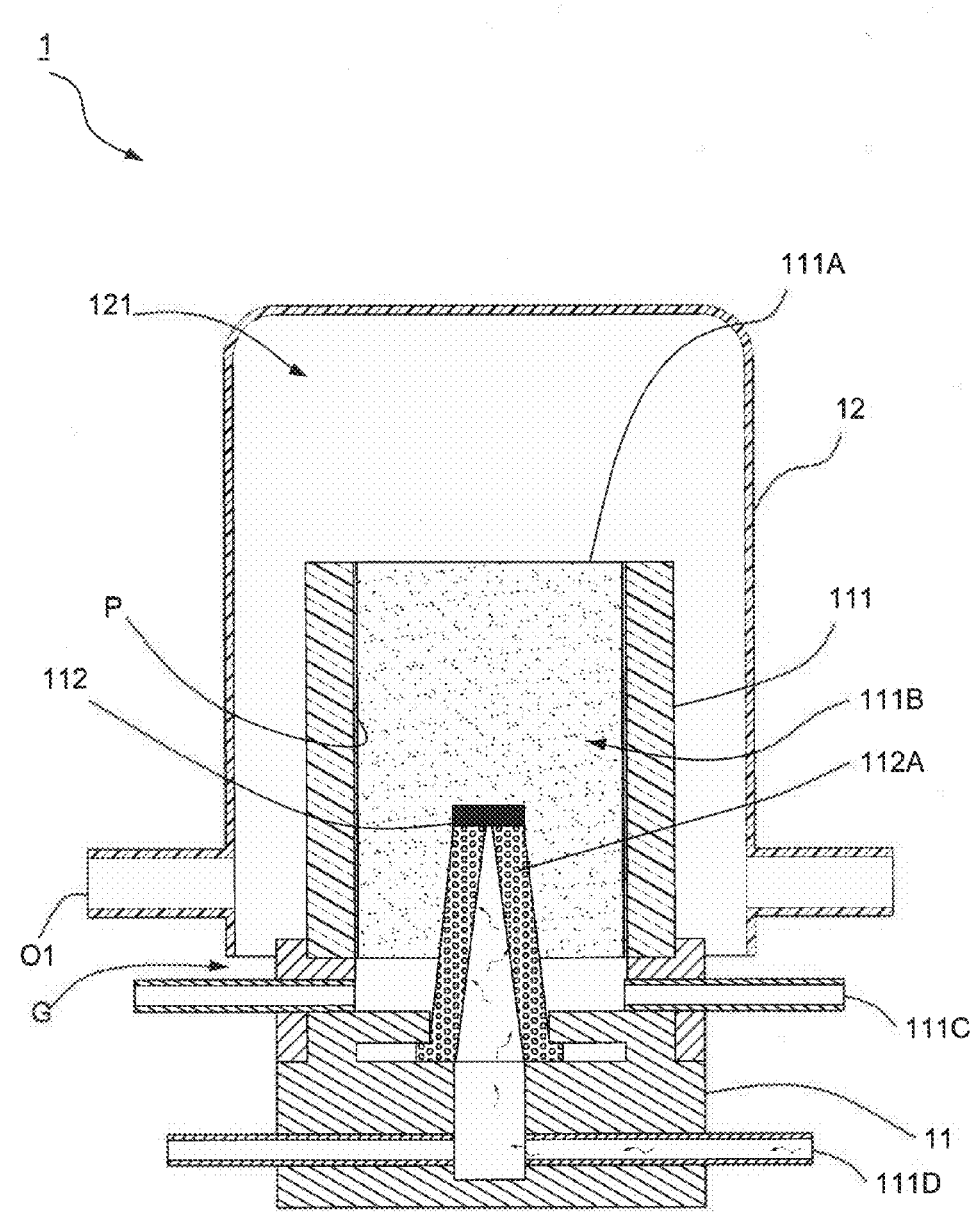
FIG. 1 is a schematic view showing a first preferred embodiment of the present invention.

Wherever possible, the same reference numbers are used in the drawings and the description to refer to the same or like parts.

Figure 2:
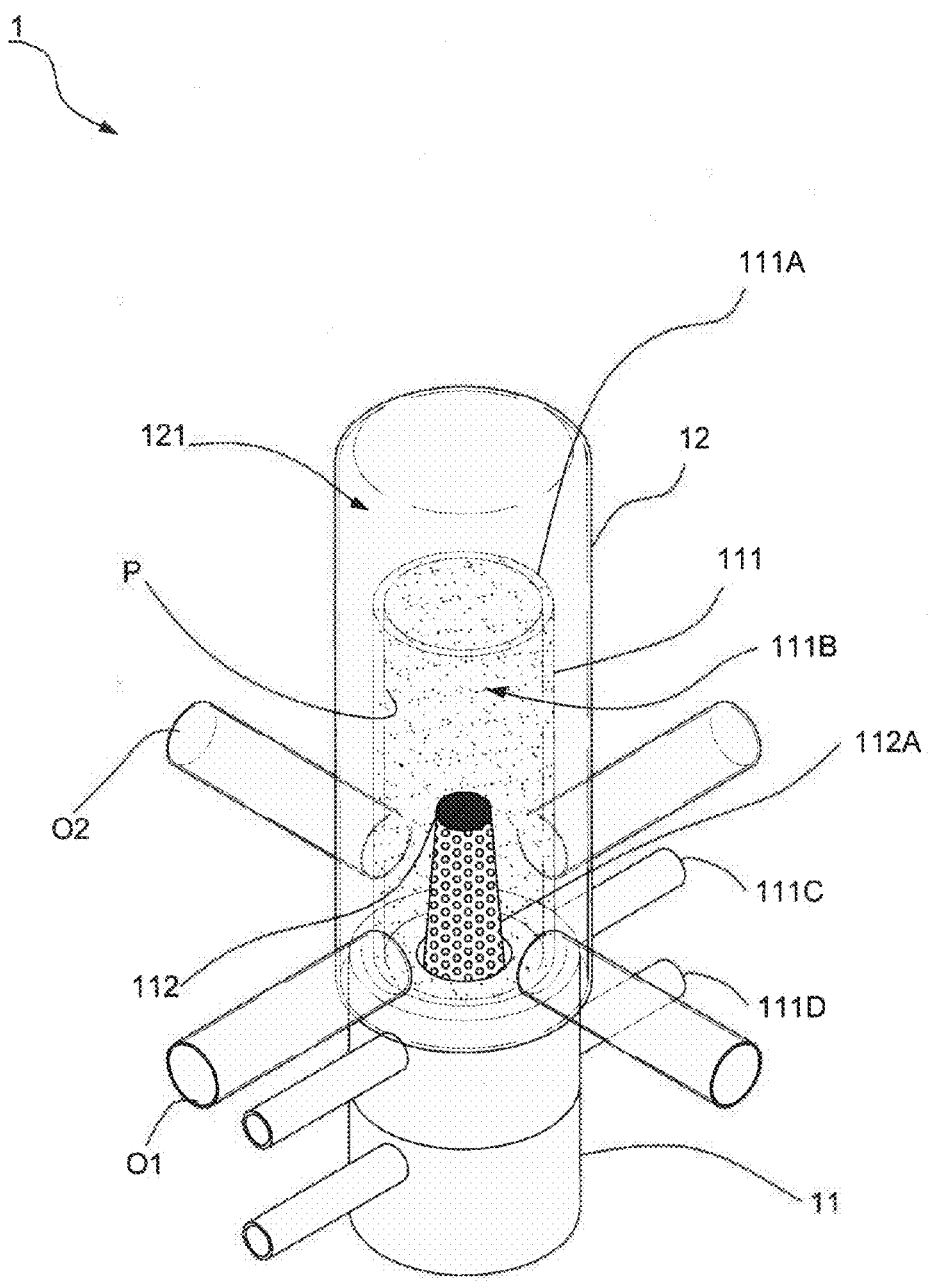
FIG. 2 is a perspective view showing the first preferred embodiment of the present invention.
Figure 3:
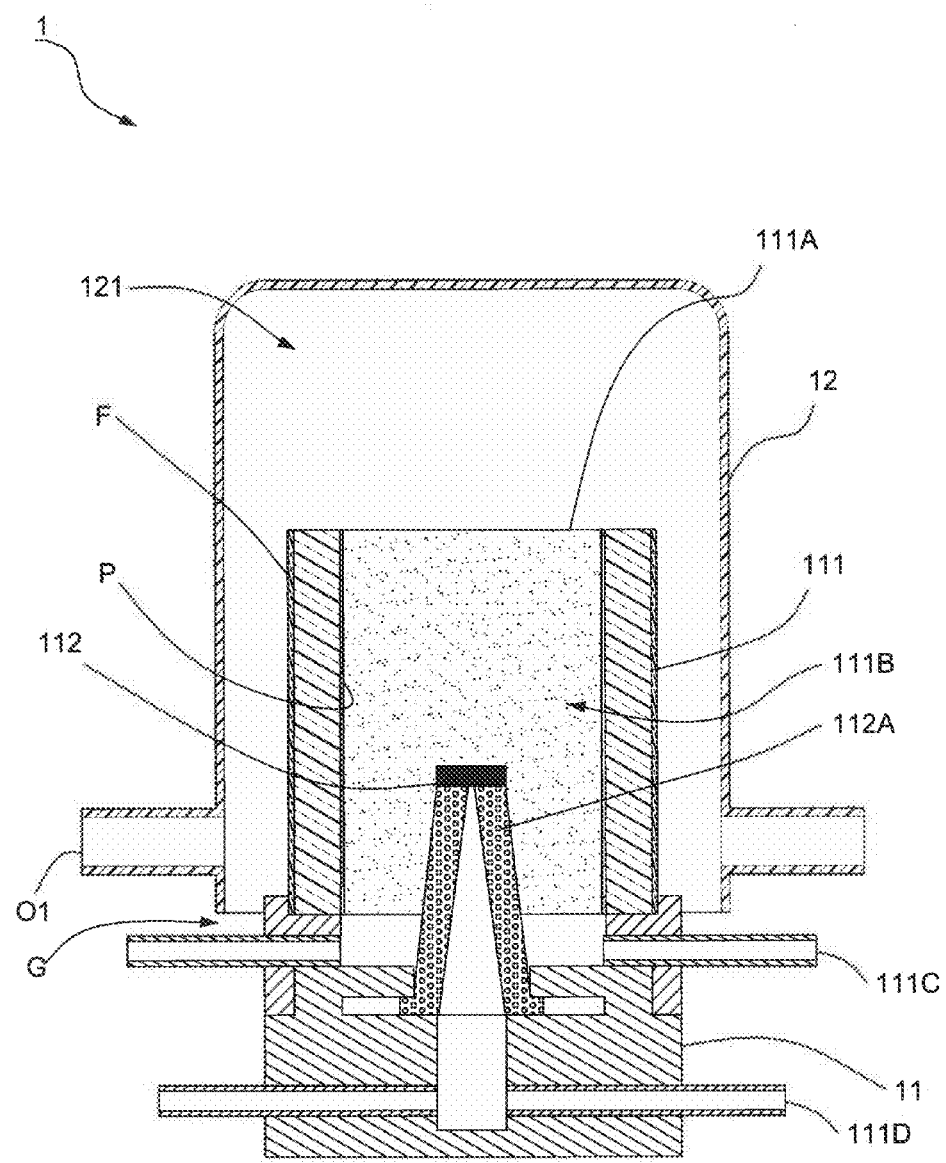
FIG. 3 is a schematic view showing a second preferred embodiment of the present invention.

Referring to FIGS. 1 to 3, a first preferred embodiment of the present invention is shown. A combustor 1 applied in thermophotovoltaic system comprises a combustion device 11 and a reversed tube 12. Wherein, the combustion device 11 includes a combustion body 111 and a burning unit 112 disposed in the combustion body 111. The combustion body 111 is transparent and heat-resistant. The combustion body 111 includes an inner wall, an outer wall, an opening 111A surrounded by an end of the inner wall, and an accommodating room 111B cooperatively formed by a surrounding of the inner wall as well as communicated with the opening 111A. The burning unit 112 is disposed to insert into the accommodating room 111B. A burning-supported medium P is attached to the inner wall of the combustion body 111. In this embodiment, the burning-supported medium P adopts metal-oxide-deposited coating, and the covering density of the metal-oxide-deposited particles could be freely adjusted for meeting practical needs. In order to provide a best performance, the outer wall of the combustion body 111 is plated with a filter F (as shown in FIG. 3). Moreover, a gas inlet 111C for an entrance of combustion-supporting gas, a fuel inlet 111D for an entrance of fuel, and a first outlet O1 for discharge of hot product gas derived from combusting are respectively defined on the combustion body 111. Thereby, a fuel/air mixture is released via the burning unit 112 (as shown by arrows in FIG. 1). Herein, the fuel is directed to liquid fuel that could be injected into the fuel inlet 111C. Further, the burning unit 112 is made of metal, such as stainless steel, and a plurality of holes 112A are defined thereon. The porosity on the burning unit 112 could be also freely adjusted for meeting practical needs.

Moreover, covering the combustion body 111, the reversed tube 12 reserves a gap in front of the opening 111A of the combustion body 111. A room 121 for swirling is concurrently brought about while the reversed tube 12 covering the combustion body 111. The room 121 and the accommodating room 111B of the combustion body 111 are intercommunicated via the opening 111A. The gap beneath the reversed tube 12 and above the combustion body 111 is reserved for discharging the hot product gas generated in combustion. Herein, a plurality of second outlets O2 are defined on the reversed tube 12. In this embodiment, there are four second outlets O2 defined on the reversed tube 12, but only some of the outlets O2 are shown in the figure.

In combustion, the liquid fuel is injected through the fuel inlet 111D (as arrowed), and the burning unit 112 in the combustion body 111 greatly enhances the contact area and the thermal conductivity between the flame and the fuel/air mixture. Accordingly, the liquid fuel is fully vaporized, which results in the flame stabilization. Moreover, the flame within the combustion body 111 heats the temperature-resistant burning-supported medium (metal-oxide-deposited coating) P for offering higher radiation. At the same time, the filter F plated on the outer wall allows proper radiant light wave to get into a photovoltaic cell plate (not shown), so that collected photons are able to be converted into electricity, and the rest of the radiant light wave is reflected back to the combustion body 111 for further heating the combustion body 111. Wherein, when the density of the metal-oxide-deposited coating P is controlled appropriately, the flame in the combustion body 111 provides luminescence for increasing the efficiency of conversion of the photovoltaic cell plate. Alternatively, when a plurality of second outlets O2 are additionally defined on the reversed tube 12, the first outlet O1 on the combustion body 111 is supported, so that the hot product gas could be expelled more efficiently.

Figure 4:
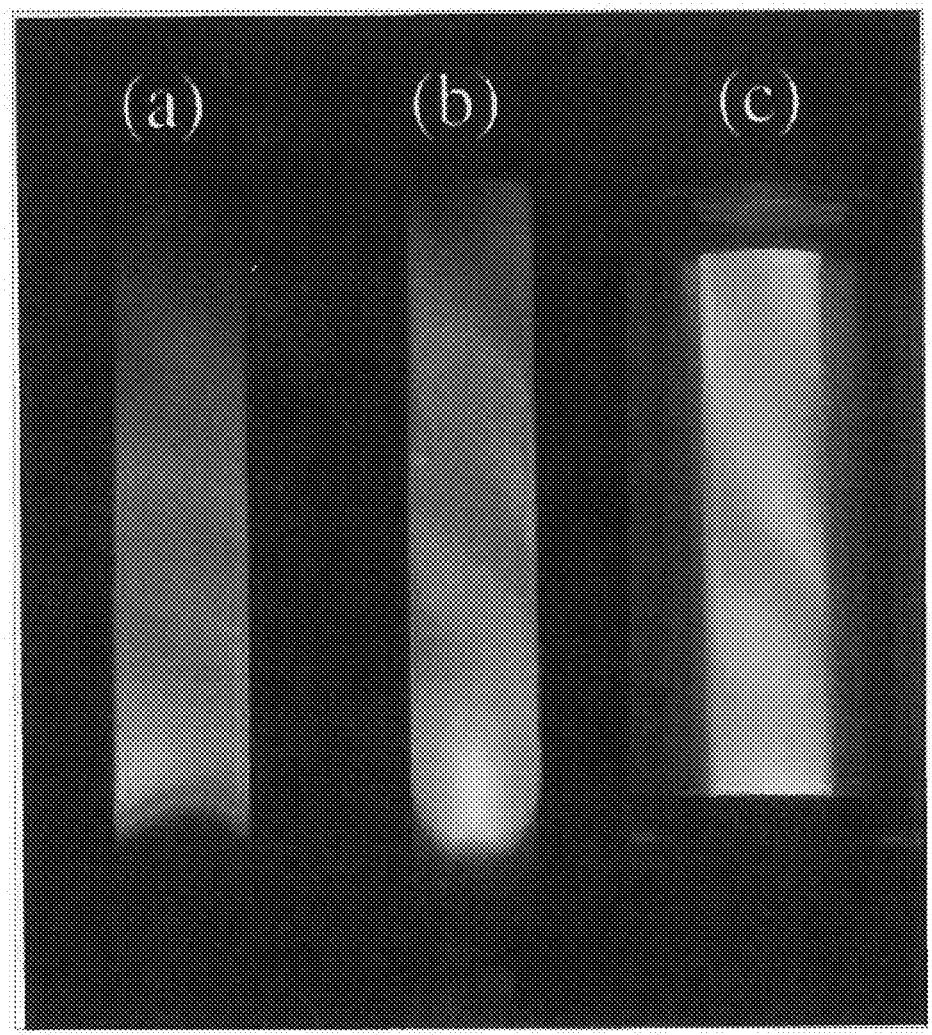
FIG. 4 is a picture showing different illumination features of relevant combustion body.

Accompanying with FIG. 4, different illumination features are shown. Tube (a) shows the burning of a silicon carbide combustion body, tube (b) shows the burning of a metal-oxide-deposited quartz combustion body without a reversed tube, and tube (c) shows the burning of a metal-oxide-deposited quartz combustion body covered with a reversed tube. It appears that since the metal-oxide-deposited quartz is generated by burning methane fuel that contains Iron pentacarbonyl, and the Iron pentacarbonyl is inflammable as well as dissoluble in an organic solvent such as n-heptane, this material adopted in the combustion body is especially suited for being processed into any form and freely stayed in the quartz tube. Thus, the feature that the metal-oxide-deposited quartz combustion could be flexibly processed preferably conquers disadvantages incurred by the materials conventionally adopted with the silicon carbide or ceramics that are difficult to machine. In addition, the disposition of the reversed tube redirects the hot product gas generated in combustion, so that the outer wall of the combustion body that especially contains metal-oxide-deposited material could be reheated. Herein, a swirling flame is forced to retain in the combustion body; thereby, a uniform and complete burning effect is achieved. Advantageously, the CO and $NO_x$ emissions are significantly reduced or avoided, and the performance of the photovoltaic cell plate enhances.

To sum up, the present invention in particularly utilizes the combustion body contained with metal-oxide-deposited material cooperating with the reversed tube to greatly generate the radiant light wave. Thereby, the photovoltaic cell plate connected to the combustor preferably converts light energy into electricity. As a result, a micro size and a low energy surprisingly provide high density of electric power, so the present invention preferably makes full use of resource.

While we have shown and described the embodiment in accordance with the present invention, it should be clear to those skilled in the art that further embodiments may be made without departing from the scope of the present invention.

We claim:

1. A combustor applied in thermophotovoltaic system comprising:

a combustion device including a combustion body and a burning unit disposed in said combustion body; wherein, said combustion body is transparent to be pervious to light and heat-resistant, and wherein, said combustion body is made of a metal-oxide-deposited quartz material; said combustion body including an inner wall, an outer wall, an opening surrounded by an end of said inner wall, and an accommodating room being cooperatively formed within said combustion body, said accommodating room being surrounded by said inner wall and in communication with said opening; said burning unit extending into said accommodating room, said burning unit contoured to form a shell structure having a plurality of openings passing therethrough throughout a surface area of said shell for supplying a controlled fuel/air mixture into said accommodating room;

a burning-supported medium coating said inner wall of said combustion body, said coating in direct contact with the accommodating room, said burning-supported medium adopting a metal-oxide-deposited coating;

a gas inlet for entrance of a combustion-supporting gas therethrough, a fuel inlet for entrance of a fuel therethrough, and a first outlet for discharge of a hot product gas derived from combustion of the fuel and gas within said combustion body; a fuel/air mixture being released via said burning unit whereby the combustion of said fuel and gas creates a combustion flame within said combustion body to produce a luminous light, wherein said flame heats said burning-supported medium, said burning-supported medium absorbing thermal energy from said flame to produce energy and create radiant lights, both said luminous light of said flame and said radiant lights of said burning-supported medium being emitted outward from said light-pervious combustion body; and a reversed tube disposed to cover said combustion body; said reversed tube having a closed end extending over said opening of said combustion body and an intermediate portion extending from said closed end to terminate at an open end, said intermediate portion extending about said combustion body, said reversed tube remaining spaced from said combustion body to define a room between said closed end and said opening of said combustion body; said room remaining in communication with said opening; and a gap being formed between said open end of said reversed tube and said combustion body for hot product gas circulated within said combustor to be discharged therethrough.

2. The combustor as claimed in claim 1, wherein, said outer wall of said combustion body is plated with a filter.

3. The combustor as claimed in claim 1, wherein, said burning unit is made of metal.

4. The combustor as claimed in claim 1, wherein, a plurality of second outlets are defined on said reversed tube.

5. The combustor as claimed in claim 1, wherein, said reversed tube is made of quartz.

* * * * *